United States Patent [19]

Bateman

[11] Patent Number: 4,947,164
[45] Date of Patent: Aug. 7, 1990

[54] FLIGHT PATH RESPONSIVE AIRCRAFT WIND SHEAR ALERTING AND WARNING SYSTEM

[75] Inventor: Charles D. Bateman, Bellevue, Wash.

[73] Assignee: Sundstrand Data Control, Inc., Redmond, Wash.

[21] Appl. No.: 146,317

[22] Filed: Jan. 21, 1988

[51] Int. Cl.$^5$ ............................................. G08B 23/00
[52] U.S. Cl. ..................... 340/968; 244/181; 340/963; 340/970; 364/433
[58] Field of Search ............... 340/963, 964, 967, 968, 340/970; 73/178 R, 178 T; 244/180, 181; 364/424, 433, 434; 342/65

[56] References Cited

U.S. PATENT DOCUMENTS

| | | | |
|---|---|---|---|
| 3,946,358 | 3/1976 | Bateman | 340/970 |
| 3,947,809 | 3/1976 | Bateman | 340/964 |
| 4,043,194 | 8/1977 | Tanner | 340/968 |
| 4,060,793 | 11/1977 | Bateman | 340/970 |
| 4,189,777 | 2/1980 | Kuntman | 340/968 |
| 4,593,285 | 6/1986 | Miller et al. | 340/968 |
| 4,725,811 | 2/1988 | Muller et al. | 340/963 |

FOREIGN PATENT DOCUMENTS

| | | | |
|---|---|---|---|
| 8601022 | 2/1986 | World Int. Prop. O. | 340/970 |
| 8701356 | 3/1987 | World Int. Prop. O. | 340/968 |

Primary Examiner—Joseph A. Orsino
Assistant Examiner—Brent A. Swarthout
Attorney, Agent, or Firm—Michael S. Yatsko; Trevor B. Joike

[57] ABSTRACT

A wind shear warning system monitors the flight path of an aircraft and wind shear in the vicinity of the aircraft and generates an advisory or cautionary message for the pilot based both on the magnitude of the wind shear and the flight path of the aircraft. When the aircraft is flying a normal flight path, a wind shear warning is generated only when relatively high negative wind shears are present. If the flight path of the aircraft is not normal, for example, if the aircraft is below the glide slope or descending too rapidly, a cautionary alert is given at lower values of wind shear. The alert or warning is selected to provide the pilot with information defining the nature of the hazard or potential hazard being encountered.

6 Claims, 1 Drawing Sheet

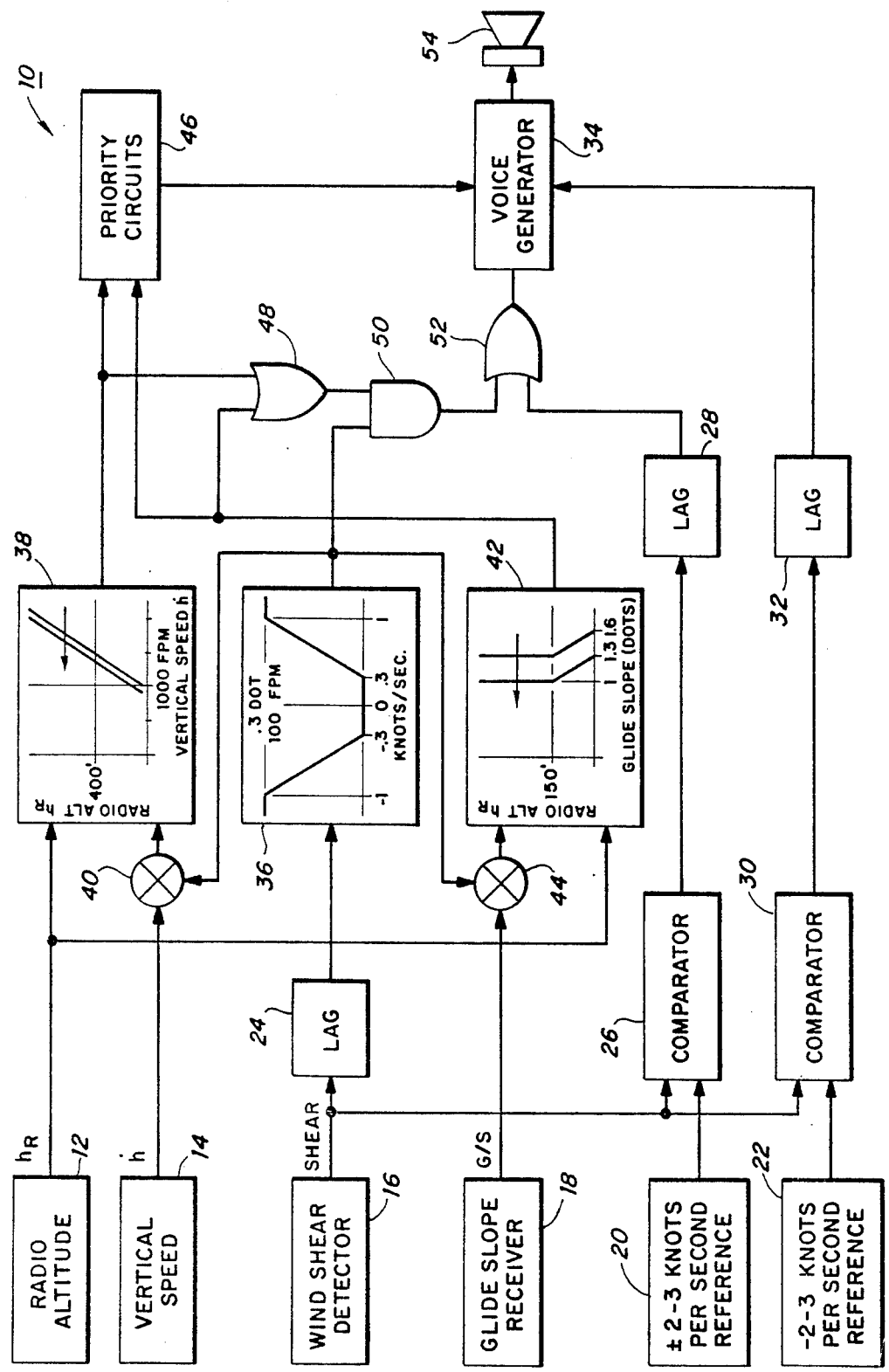

4,947,164

FLIGHT PATH RESPONSIVE AIRCRAFT WIND SHEAR ALERTING AND WARNING SYSTEM

BACKGROUND OF THE INVENTION

1. Field of the Invention

This invention relates generally to wind shear detecting and warning systems of the type that provide an alert or a warning to the pilot of an aircraft in the event of a wind shear condition. More particularly, the present invention relates to a wind shear alerting and warning system that has variable warning parameters that vary as a function of the flight path of the aircraft to provide an alert or a warning that varies as a function of flight path. An alert is provided prior to the warning if the flight path is such that the aircraft is particularly vulnerable to wind shears.

2. Prior Art

Many airborne wind shear warning systems are known. Many of such systems compare inertially derived accelerations or velocities with airmass derived accelerations or velocities to provide a wind shear warning to the pilot of the aircraft when the inertially derived and airmass derived accelerations or velocities differ by an amount sufficient to indicate a wind shear condition. Examples of such systems are disclosed in U.S. Pat. No. 4,725,811, entitled "WIND SHEAR DETECTING AND ALERTING SYSTEM", filed on Feb. 13, 1986 by Hans R. Muller, and assigned to the same assignee as the assignee of the present invention. Other wind shear detecting systems are disclosed in U.S. Pat. Nos. 4,012,713 and 4,079,905.

In the aforesaid systems, the level of wind shear at which the warning is given to the pilot must be carefully selected. In normal aircraft operation, there are many low level wind shears that are routinely compensated for by the pilot. In many instances, the pilot automatically compensates for such wind shears while maintaining his flight path, for example, staying on the glide slope, and may not even be aware that a wind shear condition was encountered. Consequently, present day wind shear warning systems are designed such that they do not provide a warning in response to low level wind shears because such warnings would be irritating and distracting to the pilot. Also, such warnings would be considered to be nuisance warnings, and consequently, many pilots would simply ignore such warnings or even turn off the warning system.

To avoid such nuisance warnings, the warning thresholds of present-day systems are set at a relatively high level. This level is sufficiently high that a substantial proportion of the performance capability and energy of the aircraft is required to escape the shear. Typically, the warning threshold is set for approximately 120 to 150 milli-G's or 2 to 3 knots per second of tail shear or vertical shear. Tail shear is defined as a decreasing head wind or an increasing tail wind or a change from a head wind to a tail wind in magnitude or direction. Vertical shear is defined as an increase in vertical downdraft or decrease in updraft. Also, the magnitude of tail shear must exceed the threshold level for a predetermined time, typically on the order of 3 to 5 seconds, before the warning is given. While a system having a threshold of negative 2 to 3 knots per second (i.e., 2 to 3 knots per second of tail shear) would give a warning in time to permit the pilot to execute a successful escape maneuver in most instances, a study of previous wind shear accidents has indicated that wind shears having magnitudes of below the threshold value have also contributed to accidents, particularly if the aircraft was flying an abnormal flight path. Such low level wind shears would not trigger a wind shear warning in systems having a threshold set at 2 to 3 knots per second of negative wind shear.

A system that utilizes a combination of flight parameters to generate a warning is disclosed in U.S. Pat. No. 4,189,777. In the system disclosed in the '777 patent there is provided a Mode 1 warning system that generates a warning if the barometric altitude sink rate is excessive for the radio altitude at which the aircraft is flying. The sink rate required to generate a warning is varied as a function of the rate of change of airspeed. In alternative embodiments, the Mode 1 warning criteria are varied as a function of the difference between the rate of change of airspeed and the rate of change of ground speed, or as a function of the difference between airspeed rate and a longitudinal accelerometer signal. However, no warning was given to the pilot that wind shear was present.

SUMMARY

Accordingly, it is an object of the present invention to overcome many of the disadvantages of the prior art systems.

It is another object of the present invention to provide a wind shear detection system that provides a cautionary wind shear alert to the pilot at relatively low levels of wind shear if the aircraft is flying or beginning an abnormal flight path.

It is yet another object of the present invention to provide a cautionary wind shear alert to the pilot of an aircraft at relatively low levels of wind shear if the flight path of the aircraft is such that the energy available to escape is degraded.

It is yet another object of the present invention to provide a cautionary alert to the pilot of an aircraft at relatively low levels of wind shear if the aircraft is below the glide slope.

It is yet another object of the present invention to provide a cautionary wind shear alert to the pilot of the aircraft at relatively low levels of wind shear if the aircraft is sinking rapidly.

It is another object of the present invention to provide the pilot of an aircraft with a specific message that defines the hazardous condition or potential hazard being encountered.

In accordance with a preferred embodiment of the invention, there is provided a system that monitors wind shear, radio altitude, vertical speed and glide slope deviation of the aircraft. The system provides four distinct messages to the pilot. The first message is the normal wind shear warning that is given when the magnitude of the wind shear is on the order to 2 to 3 knots per second of tail shear, and the shear persists for a predetermined time period, for example, 3 to 5 seconds. The pilot normally should take immediate action in the event of such a warning.

Another message is given when the magnitude of the wind shear exceeds 2 to 3 knots per second of either head shear or tail shear (i.e., either positive or negative shear, respectively) for a shorter time period, for example, 2-3 seconds. Such a message is a cautionary or advisory message and is given even in a head shear because tail shears often follow head shears. Upon the receipt of a cautionary message, the pilot need not take immediate action, but has been alerted of the danger of a potential wind shear condition.

In a third mode of operation, the wind shear signal is evaluated in combination with the signal from a glide slope receiver in order to generate a third advisory signal that is a function of both glide slope deviation and wind shear. In the preferred embodiment, the wind shear signal is used with the glide slope signal to provide another advisory message indicating that the aircraft is below the glide slope and that a wind shear condition is present. This message would be given for deviations below the glide slope smaller than those that would be considered to be hazardous when no wind shear is present, and would be considered to be another cautionary message requiring no immediate action on the part of the pilot.

In the fourth mode of operation, the wind shear signal is evaluated in combination with a signal representative of the vertical speed of the aircraft to provide an advisory message that is a function of vertical speed and wind shear, and indicating that the aircraft is descending at a rapid rate and that a wind shear condition is present. In the preferred embodiment, the radio altitude is compared with vertical speed and wind shear, and a message is generated when the combination of vertical speed and wind shear is excessive for the radio altitude at which the aircraft is flying. The vertical speed required to generate a message is less in the presence of wind shear than in the absence of wind shear.

DESCRIPTION OF THE DRAWING

These and other objects and advantages of the present invention will become readily apparent upon consideration of the following detailed description and attached drawing, wherein:

The single FIGURE is a block diagram illustrating the system according to the present invention.

DETAILED DESCRIPTION

Referring now to the drawing, there is illustrated a block diagram of the wind shear warning system according to the invention, generally designated by the reference numeral 10. The system 10 receives signals from a radio altimeter 12 and from a source of signals representative of the vertical speed of the aircraft. The vertical speed source 14 may be obtained by differentiating the output of a barometric altimeter (not shown) to obtain a barometric rate signal or by integrating a vertical acceleration signal from an inertial navigation system (not shown) in order to obtain a vertical velocity signal commonly known as a Z-velocity signal. The barometric rate signal may also be obtained from an air data computer.

A wind shear detector 16 is utilized to provide a "shear" signal which is a measure of the difference between airmass and inertially derived accelerations or velocities. One system suitable for providing the "shear" signal is described in aforementioned U.S. Pat. No. 4,725,811 filed Feb. 13, 1986 by Hans R. Muller, and incorporated herein by reference. Other prior art systems may also be utilized to provide the "shear" signal.

The system also utilizes a glide slope receiver 18 that receives a signal from a ground based glide slope beam transmitter and provides a signal representative of the deviation of the aircraft from the glide slope beam. A plus or minus 2 to 3 knots per second reference signal source 20 and a minus 2 to 3 knots per second reference source are also employed to provide a reference of comparison for the "shear" signal. The output of the wind shear detector 16 is applied to a lag circuit 24 that delays the "shear" signal by approximately 10 seconds. The "shear" signal from the wind shear detector 16 is also applied to a comparator 26 which also receives the plus or minus 2 to 3 knots per second reference signal and provides an output whenever the magnitude of the "shear" signal exceeds the plus or minus 2 to 3 knots per second reference signal. The output of the comparator 26 is applied to a lag circuit 28 which delays the signal from the comparator 26 by approximately 2-3 seconds. The output of the wind shear detector 16 is also applied to a second comparator 30 that also receives the minus 2 to 3 knots per second reference signal from the reference source 22 and provides an output if the magnitude of the shear signal exceeds minus 2 to 3 knots per second. The output of the comparator 30 is applied to a lag circuit 32 which has a lag time on the order of approximately 3-5 seconds and controls a voice generator 34. The output of the lag circuit 24 is applied to a function generator 36 which operates as a limiter with a dead band. In the illustrated embodiment, as long as the output from the lag circuit 24 has a value of less than plus or minus one-third knot per second, the output of the function generator 36 is zero. If the output from the lag circuit 24 exceeds plus or minus 1 knot per second, the output of the function generator reaches its maximum value. Between plus one-third and plus 1 knot per second, and between minus one-third and minus 1 knots per second, the output of the function generator rises gradually from zero to its maximum value as illustrated by the graph within the block 36. The function of the function generator 36 will be discussed in greater detail in a subsequent portion of the specification.

A sink rate warning comparator 38 receives a signal representative of radio altitude or altitude above ground from the ratio altitude source 12. In addition, the sink rate warning comparator 38 receives a signal representative of vertical speed from the vertical speed signal source 14 via a summing junction 40. The summing junction 40 also receives the output signal from the function generator 36 and serves to bias the vertical speed signal in accordance with the output of the function generator 36. The sink rate warning generator compares the biased vertical speed signal from the summing junction 40 with the radio altitude signal from the radio altitude signal source, and provides an output signal if the biased vertical speed is excessive for the altitude at which the aircraft is flying. Examples of sink rate warning generators are disclosed in U.S. Pat. Nos. 3,947,808, 4,060,793 and 4,215,334, incorporated herein by reference.

A glide slope warning comparator 42 also receives a signal representative of altitude above ground, or radio altitude, from the radio altitude signal source 12. In addition, the glide slope warning comparator receives the signal from the glide slope receiver 18 via a summing junction 44. The summing junction also receives a signal from the function generator 36 and serves to bias the signal from the glide slope receiver in accordance with the signal from the function generator 36. The glide slope warning comparator 42 compares the biased glide slope signal with the signal from the radio altitude source, and provides an output if the aircraft is excessively below the glide slope for the altitude above ground at which it is flying. Glide slope warning systems having comparators usable as the comparator 42 are disclosed in U.S. Pat. Nos. 3,925,751, 3,946,358 and 3,988,713, also incorporated herein by reference. The outputs of the sink rate warning comparator 38 and the glide slope warning comparator 42 are applied to a priority circuit 46 and to a series of gates 48, 50 and 52. The priority circuit 46 and the gates 48, 50 and 52 control the voice generator in order to provide the appropriate message, based on various flight parameters, to the pilot via a transducer 54.

The system according to the present invention provides the pilot of an aircraft with both warning and cautionary messages. The criteria for generating a warning message are based on the magnitude of the "shear" signal generated by the wind shear detector 16 relative to the signal provided by the minus 2 to 3 knots per second reference 22, as determined by the comparator 30. To generate the wind shear warning, the magnitude of the "shear" signal from the wind shear detector 16 is monitored by the comparator 30. Only negative shears, that is shears tending to decrease the performance of the aircraft such as downdrafts and changes from a headwind to a tailwind are considered. The shear signal is monitored by the comparator 30, and in the event that a relatively large shear is encountered, for example, minus 2 to 3 knots per second, as determined by the reference 22 the comparator 30 provides an output indicating that a large negative shear is present. The output of the comparator 30 is applied to the lag circuit 32 which has a time delay on the order of 3-5 seconds, and the delayed signal from the lag circuit 32 is applied to the voice generator 34. Upon receipt of the signal from the lag circuit 34, the voice generator generates an oral warning such as WIND SHEAR, WIND SHEAR, optionally preceded or followed by a siren sound, and applies this signal to the transducer 54. Upon receipt of the warning, the pilot must increase the energy of the aircraft, and in the event of a landing, execute a missed approach maneuver.

However, as previously discussed, if the approach to land flight path near the ground or water is not proper or begins to degrade, for example, if the aircraft is or begins descending too rapidly, or if the aircraft is or begins to go below the glide slope in the presence of relatively small wind shears having a magnitude of less than the reference set by the minus 2 to 3 knots per second reference 22, these shears also pose a threat to the aircraft. However, because of their low magnitude, such wind shears would not cause a wind shear warning to be generated.

To advise the pilot of potentially hazardous low level wind shears, the system monitors the change in the flight path of the aircraft, and provides a cautionary or advisory message to the pilot in the presence of low level wind shears that occur in conjunction with a rapidly degrading flight path short of the runway. In addition, the system generates a cautionary message in the event of an increasing performance shear such as an updraft or a head shear wherein the wind changes from a tailwind to a headwind. The cautionary message given in the presence of an increasing performance shear is given not because an increasing performance shear is a hazard per se to the aircraft, but rather because an increasing performance shear is often followed by a decreasing performance shear that may be hazardous. The aforesaid cautionary signal is generated by the comparator 26, the plus or minus 2 to 3 knots per second reference 20, the lag circuit 28 and the voice generator 34 which receives a signal from the lag circuit 28 via the OR gate 52. The comparator 26 monitors the magnitude of the "shear" signal from the wind shear detector 16, and in the event that it exceeds the reference value provided by the reference circuit 20, for example, plus or minus 2 to 3 knots per second, the comparator 26 provides a signal indicating that a relatively large magnitude positive or negative wind shear had been encountered. The output of the comparator 26 is applied to the lag circuit 28 whose output is applied to the voice generator 34 via the OR gate 52 to cause the voice generator to generate a cautionary warning. The cautionary message could be a message such as CAUTION WIND SHEAR.

The lag circuit 28 provides a shorter time delay than the delay provided by the lag circuit 32. For example, the time delay provided by the lag circuit 28 could be on the order of 2-3 seconds. Thus, in the event that the shear detected by the wind shear detector 16 exceeded the magnitude provided by the reference circuit 20, the cautionary message would be provided 2-3 seconds following the detection of the shear. In the event that the shear encountered were an increasing performance shear, i.e., a head shear, no further message would be provided. However, if the shear encountered were a decreasing performance shear, i.e., a tail shear, the cautionary message would be followed by a warning after the 3-5 second delay provided by the lag circuit 32. Thus, the cautionary message would alert the pilot to the possibility of a subsequent warning. If the warning did not follow, the pilot could choose to ignore the cautionary message. However, if the warning did occur, the pilot would be prepared to act immediately.

The system according to the invention also monitors the flight path. For example, the sink rate comparator 38 compares the vertical speed of the aircraft with its radio altitude. In the absence of wind shear, a set of criteria are established for providing an excessive sink rate warning in the event that the sink rate is excessive for the altitude at which the aircraft is flying. In the present invention, the warning criteria are altered so that the warning is provided sooner in the presence of wind shear. Thus, in the presence of low level wind shears, a cautionary message is provided at lower vertical speeds than when wind shears are not present. This is accomplished in the present invention by biasing the vertical speed signal from the vertical speed signal source 14 with the output signal from the function generator 36. This has the effect of moving the warning envelope to the left as indicated by the graph within block 38 by a predetermined amount in the presence of a wind shear, in the present embodiment, either a positive or negative wind shear.

As is illustrated by the graph within the function generator 36, which represents the output of the function generator 36 as a function of the lagged "shear" signal applied thereto from the lag circuit 24, as long as the magnitude of the lagged "shear" signal is between plus or minus one-third knot per second, the output of the function generator 36 remains zero. Thus, no alteration of the criteria required to generate an output from the sink rate comparator 38 is made. However, if the magnitude of the lagged "shear" signal exceeds plus or minus one-third knot per second, the output of the function generator 36 gradually increases until it reaches a maximum value at plus and minus one knot per second. In the illustrated embodiment, this maximum value corresponds to a value of 100 feet per minute. The maximum value signal from the function generator 36 results in an output from the sink rate comparator at a sink rate of 100 feet per minute sooner than would be provided absent any signal from the function generator 36. The output of the sink rate comparator 38 is applied to a priority circuit 46, and to an OR gate 48. The output of the function generator 36 is applied to an AND gate 50 which also receives the output from the OR gate 48. The priority circuit 46 and the gates 48, 50 and 52 cooperate to cause the voice generator 34 to generate a voice message indicating that low level wind shear is present and the aircraft has an excessive sink rate. Such a message would be a cautionary message such as CAUTION, WIND SHEAR, SINK RATE. Such a message would provide the pilot with information indicating that his sink rate is excessive and that low level wind shears which could be hazardous at his sink rate are present in the area.

In addition, the glide slope comparator 42 compares the glide slope deviation signal from the glide slope receiver 18 with the radio altitude signal from the radio altitude signal source 12 to provide an output in the event that the pilot sinks excessively below the glide slope. In a below glide slope warning system such as the one disclosed in the aforementioned U.S. Pat. No. 3,925,751, a below glide slope indication is generated if the pilot drops more than a predetermined amount below the glide slope. In the present system, the predetermined amount is set to 1.3 dots below the glide slope at altitudes above 150 feet. Below 150 feet above the ground, greater deviations are permitted to reduce nuisance warnings. In the system as contemplated, as long as the magnitude of the lagged "shear" signal is below plus and minus one-third knot per second, no alteration is made to the warning criteria. However, as the magnitude of the lagged "shear" signal increases, the output from the function generator 36 also increases until it reaches its maximum output at plus and minus 1 knot per second. This maximum output corresponds to a shift in the warning criteria for the glide slope comparator of one-third dot. Thus, the glide slope warning envelope is moved to the left by one-third dot so that a below glide slope indication is given at only 1 dot deviation below the glide slope when the wind shear exceeds plus or minus 1 knot per second. The output of the glide slope comparator 42 is also applied to the OR gate 48 and to the priority circuit 46 Upon receipt of a signal from the glide slope comparator 42, the priority circuit 46 cooperates with the gates 48, 50 and 52 to cause the voice generator to issue a cautionary message such as, for example, CAUTION, WIND SHEAR, GLIDE SLOPE to indicate that the aircraft is below the glide slope and that low level wind shear that could be hazardous in such a below glide slope situation is present. In the event that the pilot is below the glide slope and he also has an excessive descent rate, the priority circuit operates to prioritize the two cautionary warnings. In such an event, the cautionary warning might be CAUTION, WIND SHEAR, SINK RATE, GLIDE SLOPE. If an excessive sink rate or an excessive glide slope deviation were present, but a wind shear in excess of plus or minus one-third knot per second were not present, then the warning could simply be GLIDE SLOPE or SINK RATE, depending on whether the glide slope deviation or sink rate were excessive.

While a particular embodiment of the present invention has been illustrated, the invention may be implemented in a variety of ways. For example, the sink rate and glide slope cautionary criteria were varied by biasing the glide slope and vertical speed signals in the illustrated embodiment, the glide slope and sink rate advisory criteria could be otherwise altered, for example, within the respective warning comparators 42 and 38 without biasing the glide slope or vertical speed signals. Alternatively, the criteria for generating a cautionary wind shear signal could be altered as a function of vertical speed and glide slope deviation without utilizing comparators such as the sink rate and glide slope comparators 38 and 42. For example, the radio altitude, vertical speed and glide slope signals could be combined to alter the threshold at which a cautionary signal is given as a function of the radio altitude, vertical speed and glide slope signals. For example, the plus or minus 2 to 3 knots per second reference provided by the reference 20 could be altered as a function of radio altitude, vertical speed and glide slope deviation to reduce the magnitude of the reference when excessive vertical speed or excessive glide slope deviation is present. Alternatively, the radio altitude, vertical speed and glide slope deviation signals could be used to bias the shear signal from the wind shear detector 16 or to bias the comparator 26 to generate a cautionary indication at shear rates of less than 2 to 3 knots per second. Also, the invention may be implemented either with analog or digital circuitry, or with a combination thereof.

What is claimed and desired to be secured by Letters Patent of the United States is:

1. A wind shear responsive alerting system for an aircraft comprising:
   means for receiving a signal representative of the deviation of the aircraft from the glideslope;
   means for receiving a signal representative of wind shear;
   means responsive to the glideslope deviation representative signal for providing a message to the pilot of the aircraft when the aircraft descends below the glideslope by a predetermined amount; and
   means responsive to the wind shear representative signal for reducing the amount of deviation below the glideslope required to provide a message to the pilot when the wind shear representative signal exceeds a predetermined value, wherein said glideslope deviation signal responsive means is operative to provide a first message when the aircraft descends below the glideslope by said predetermined amount and said wind shear signal responsive means is operative to provide a second different message to the pilot when the wind shear representative signal exceeds said predetermined value and said glideslope deviation representative signal exceeds said reduced amount of deviation.

2. A wind shear alerting system as recited in claim 1 wherein said wind shear signal responsive means is operative to provide a third message to the pilot when the wind shear representative signal exceeds a second predetermined value greater than said predetermined value.

3. A wind shear alerting system as recited in claim 2 wherein said third message is provided only when the wind shear representative signal indicates the presence of tail shear and wherein said wind shear signal responsive means is operative to provide a fourth message when the wind shear representative signal indicates a head shear.

4. A wind shear alerting system as recited in claim 1 further including means for receiving a signal representative of the vertical speed of the aircraft and means responsive to the vertical speed representative signal and the wind shear representative signal for providing another message to the pilot when the combination of the vertical speed and wind shear signals exceeds a predetermined value.

5. A wind shear responsive warning system for an aircraft comprising:
   means for receiving a signal representative of the descent rate of the aircraft;
   means for receiving a signal representative of the deviation of the aircraft from the glideslope;
   means for receiving a signal representative of both positive and negative wind shears; and
   means responsive to the received descent rate signal, glideslope deviation signal and wind shear signal for providing a first distinct message if the descent rate of the aircraft is excessive for the altitude at which the aircraft is flying, for providing a second distinct message if the aircraft descends below the glideslope by a predetermined amount and for providing a third distinct message if the wind shear representative signal indicates a negative wind shear in excess of a predetermined value, said message providing means being responsive to a combination of the wind shear representative signal and one of said descent rate and glideslope deviation signals for providing a different message if the combination of positive or negative wind shear and one of said glideslope deviation and descent rate signals exceeds a predetermined value.

6. A wind shear responsive warning system as recited in claim 5 wherein said third distinct message is provided if the negative wind shear signal is present for a predetermined time interval and said message providing means is operative to provide another message if the wind shear representative signal indicates either a positive or a negative wind shear for a time interval that is shorter than said predetermined time interval.

* * * * *